(12) United States Patent
Heath et al.

(10) Patent No.: US 7,904,255 B1
(45) Date of Patent: Mar. 8, 2011

(54) DEVICE FOR ASSESSING OPERATING-MODE TRANSITION RELIABILITY

(75) Inventors: Taliver B. Heath, Mountain View, CA (US); Christopher M. Sadler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 12/364,705

(22) Filed: Feb. 3, 2009

(51) Int. Cl.
*G01B 3/44* (2006.01)
(52) U.S. Cl. .......................................... 702/34; 702/181
(58) Field of Classification Search .................. 702/32, 702/34, 76, 83, 179, 180, 57, 181, 193; 700/47, 700/79; 701/35; 340/635
See application file for complete search history.

(56) References Cited

U.S. PATENT DOCUMENTS 5,210,704 A * 5/1993 Husseiny ........................ 702/34

* cited by examiner

*Primary Examiner* — John H Le
(74) *Attorney, Agent, or Firm* — Park, Vaughan, Fleming & Dowler LLP

(57) ABSTRACT

Embodiments of a system (such as a computer system), a circuit, a method and a computer-program product (e.g., software) for use with the computer system are described. In these embodiments, one or more physical characteristics of a device may be monitored, and the measured values may be used to assess the reliability of a device. In particular, using hardware and/or software, the probability that the device will be unable to restart if the device is switched to a powered-on operating mode may be determined based at least in part on the one or more measured values and predetermined probabilities of occurrence of one or more failure mechanisms in the device. If the probability is less than a threshold value, the device may be safely transitioned to a powered-on operating mode. However, if the probability exceeds the threshold value, the device may be kept in a power-saving mode until remedial action is taken.

22 Claims, 5 Drawing Sheets

FIG. 5

```
FAILURE              DEVICE(S)   FAILURE MECHANISM   FAILURE PROBABILITY   FAILURE MECHANISM
STATISTICS           512-1       514-1               516-1                 514-2
510-1                            FAILURE MECHANISM   FAILURE PROBABILITY
FAILURE                          514-3               516-3
STATISTICS           FAILURE PROBABILITY
510-2                516-2
...
```

```
DEVICE      TIME        PHYSICAL              PROBABILITY   TIME
610-1       612-1       CHARACTERISTIC(S)     616-1         612-2
                        614-1
DEVICE                  PHYSICAL              PROBABILITY
610-2                   CHARACTERISTIC(S)     616-2
                        614-2
...
```

600

DEVICE FOR ASSESSING OPERATING-MODE TRANSITION RELIABILITY

BACKGROUND

1. Field

The present embodiments relate to devices and techniques for assessing reliability. More specifically, the present embodiments relate to devices and techniques for assessing the reliability of a process for transitioning a device to and/or from a power-saving mode.

2. Related Art

Many systems include extra components that duplicate the functionality provided by other components in these systems. These extra components are included in these systems to help ensure continuous operation in the event of a failure of one of the other components or if maintenance needs to be performed on one of the other components.

Typically, the extra components are kept in an active operating mode or a hot standby operating mode, both of which provide power to the extra components. This operational configuration is usually selected because of reliability concerns. In particular, if these extra components are powered down, there is a risk that one or more of them may not restart when needed, thereby obviating the redundancy that these extra components are supposed to provide. However, keeping the extra components powered on significantly increases the power consumption of these systems and hence increases operating costs.

SUMMARY

One embodiment provides a system (such as a computer system) that includes a device, a metrology mechanism that measures one or more physical characteristics associated with the device, and an analysis mechanism. This analysis mechanism determines a probability that the device will be unable to restart if the device is switched to a powered-on operating mode. Moreover, the probability is determined based at least in part on one or more values of the one or more physical characteristics and predetermined probabilities of occurrence of one or more failure mechanisms.

In some embodiments, the metrology mechanism measures: an electrical characteristic of the device, vibrations associated with operation of the device, wear of one or more components in the device and/or a torque corresponding to friction between components in the device. For example, the friction may include static or dynamic friction. Moreover, this torque may be measured by applying one or more transient electrical signals to the device.

Furthermore, the analysis mechanism may be implemented in hardware and/or in software. Thus, the analysis mechanism may be a circuit and/or the analysis mechanism may be a computer that executes a program module that includes instructions for determining the probability. Additionally, the probability may be determined using a supervised-learning model that has the one or more values of the one or more physical characteristics as inputs and the probability as an output.

Note that the device may include: an electro-motor, two or more components that are configured to move relative to each other when the device is in a powered-on operating mode, a power supply, a computer, and/or an electrical socket. For example, the device may include: a hard disk drive, a fan and/or a pump.

In some embodiments, if the probability exceeds a threshold value, the device is switched to and maintained in the powered-on operating mode until remedial action is taken.

Another embodiment provides the computer system.

Another embodiment provides a method for assessing reliability of the device, which may be performed in the system. During operation, the system measures one or more physical characteristics associated with the device using the metrology mechanism. Then, using the analysis mechanism, the system determines the probability that the device will be unable to restart if the device is switched to the powered-on operating mode. This probability is determined based at least in part on one or more values of the one or more physical characteristics and predetermined probabilities of occurrence of one or more failure mechanisms.

In some embodiments, the system switches and maintains the device in the powered-on operating mode until remedial action is taken if the probability exceeds the threshold value.

Another embodiment provides a computer-program product for use in conjunction with the system. This computer-program product may include instructions corresponding to at least some of the above-described operations that are performed by the system.

BRIEF DESCRIPTION OF THE FIGURES

FIG. 5 is a block diagram illustrating an embodiment of a data structure.

FIG. 6 is a block diagram illustrating an embodiment of a data structure.

Note that like reference numerals refer to corresponding parts throughout the drawings.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present disclosure is not intended to be limited to the embodiments shown, but is to be accorded the widest scope consistent with the principles and features disclosed herein.

Embodiments of a system (such as a computer system), a circuit, a method and a computer-program product (e.g., software) for use with the computer system are described. In these embodiments, one or more physical characteristics of a device may be monitored, and the measured values may be used to assess the reliability of a device. In particular, using hardware and/or software, the probability that the device will be unable to restart if the device is switched to a powered-on operating mode (such as an active operating mode or a hot standby operating mode) may be determined based at least in part on the one or more measured values and predetermined probabilities of occurrence of one or more failure mechanisms in the device. If the probability is less than a threshold value, the device may be safely transitioned to the powered-on operating mode. However, if the probability exceeds the threshold value, the device may be kept in a power-saving mode until remedial action is taken (such as repairing or replacing the device). By allowing the device to be selectively and reliably powered up or down, this reliability assessment technique decreases the power consumption and operating costs of systems that include the device.

Figure 1:
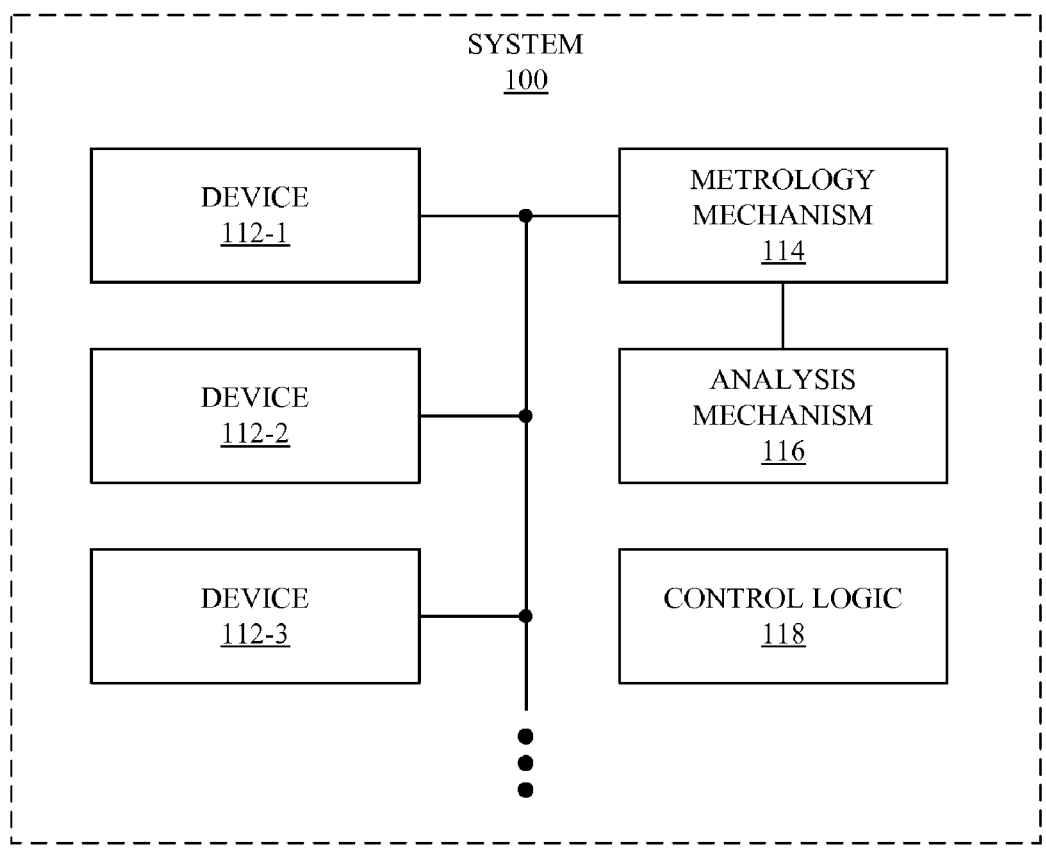
FIG. 1 is a block diagram illustrating an embodiment of a system.

We now describe embodiments of a system that includes one or more instances of a device. FIG. 1 presents a block diagram illustrating a system 100. This system includes devices 112, as well as metrology mechanism 114, analysis mechanism 116 and control logic 118. Metrology mechanism 114 measures one or more physical characteristics associated with one or more of devices 112, such as device 112-1. These measurements may be performed: once, periodically and/or as needed (such as event-driven measurements that are in response to a signal or a request from device 112-1). Furthermore, measurements on at least some of devices 112 may be performed separately or concurrently. For example, metrology mechanism 114 may sequentially perform measurements on devices 112.

Using measured values of the one or more physical characteristics and predetermined probabilities of occurrence of one or more failure mechanisms in devices similar to device 112-1, analysis mechanism 116 determines a probability that device 112-1 will be unable to restart if device 112-1 is switched from a power-saving mode to an active or powered-on operating mode. This probability may be provided to control logic 118.

If the probability is less than a threshold value (such as 0.1 or 1%), control logic 118 may provide signals or instructions that selectively transition device 112-1 to the powered-on operating mode when device 112-1 is needed. However, if the probability is more than the threshold value, control logic 118 may provide signals or instructions that maintain device 112-1 in the power-saving mode until remedial action is performed (such as repairing or replacing device 112-1). Alternatively, if the probability is more than the threshold value, control logic 118 may provide signals or instructions that transition device 112-1 to the powered-on operating mode, and which maintain device 112-1 in the powered-on operating mode until the remedial action is performed. In this way, the reliability-assessment technique facilitates reduced power consumption and operating cost associated with system 100, while maintaining the reliability and availability of devices 112. In particular, the reliability-assessment technique allows at least some of devices 112 to be safely powered down or up while ensuring that unreliable devices are identified and remedial action is taken.

In some embodiments, system 100 includes a computer system, such as a data center. However, system 100 should be understood to include electrical and mechanical systems that include multiple components (for example, automobiles). Similarly, in different embodiments, devices 112 may include different types of electrical components. For example, device 112-1 may include an electro-motor, such as: a hard disk drive, a fan and/or a pump. More generally, devices 112 may include: two or more components that are configured to move relative to each other when a given device is in the powered-on operating mode, a power supply, a computer, and/or an electrical socket.

In system 100, metrology mechanism 114 may measure a wide variety of phenomena, including hardware and software characteristics. These measurements may include: an electrical characteristic of the given device, vibrations associated with operation of the given device, wear of one or more components in the given device, and/or a torque corresponding to friction between components in the device. For example, the electrical characteristic may include current, voltage or the electrical resistance of a coil; wear may include spacing between at least two components that is measured using interferometry; and the friction may include static or dynamic friction, and metrology mechanism 114 may measure the torque by applying one or more transient electrical signals to the given device. Note that the measurements, as well as the subsequent analysis by analysis mechanism 116, may be in the time and/or in the frequency domain.

Moreover, analysis mechanism 116 and control logic 118 may be implemented in hardware and/or in software. Thus, the analysis mechanism 116 may be a circuit (such as an application-specific integrated circuit or a digital signal processor). Alternatively or additionally, analysis mechanism 116 may be a processor (or more generally, a computer) that executes a program module that includes instructions for determining the probability.

In some embodiments, analysis mechanism 116 determines the probability using a supervised-learning model that has the one or more values of the one or more physical characteristics as inputs and the probability as an output. This supervised-learning model may be trained using training data that includes a temporal sequence of values of the one or more physical characteristics and the occurrences of one or more failure mechanisms in a group of devices. For example, the one or more failure mechanisms may include failure mechanisms that prevent devices in the group of devices from restarting, i.e., from transitioning back to the powered-on operating mode from the power-saving mode. Note that this group of devices may be similar to or the same type of device as devices 112.

While FIG. 1 illustrates system 100 with a shared metrology mechanism 114 and a shared analysis mechanism 116, in other embodiments at least a portion of either or both of these components may be replicated multiple times, and there may be a dedicated relationship between a given instance of either or both of these components and the given device. Moreover, in some embodiments, instances of either or both of these components may be included in each of devices 112. In addition, while system 100 is illustrated as including metrology mechanism 114 and analysis mechanism 116, in other embodiments at least a portion of either or both of these components may be remotely located from system 100 (which is described further below with reference to FIG. 3).

Figure 2:
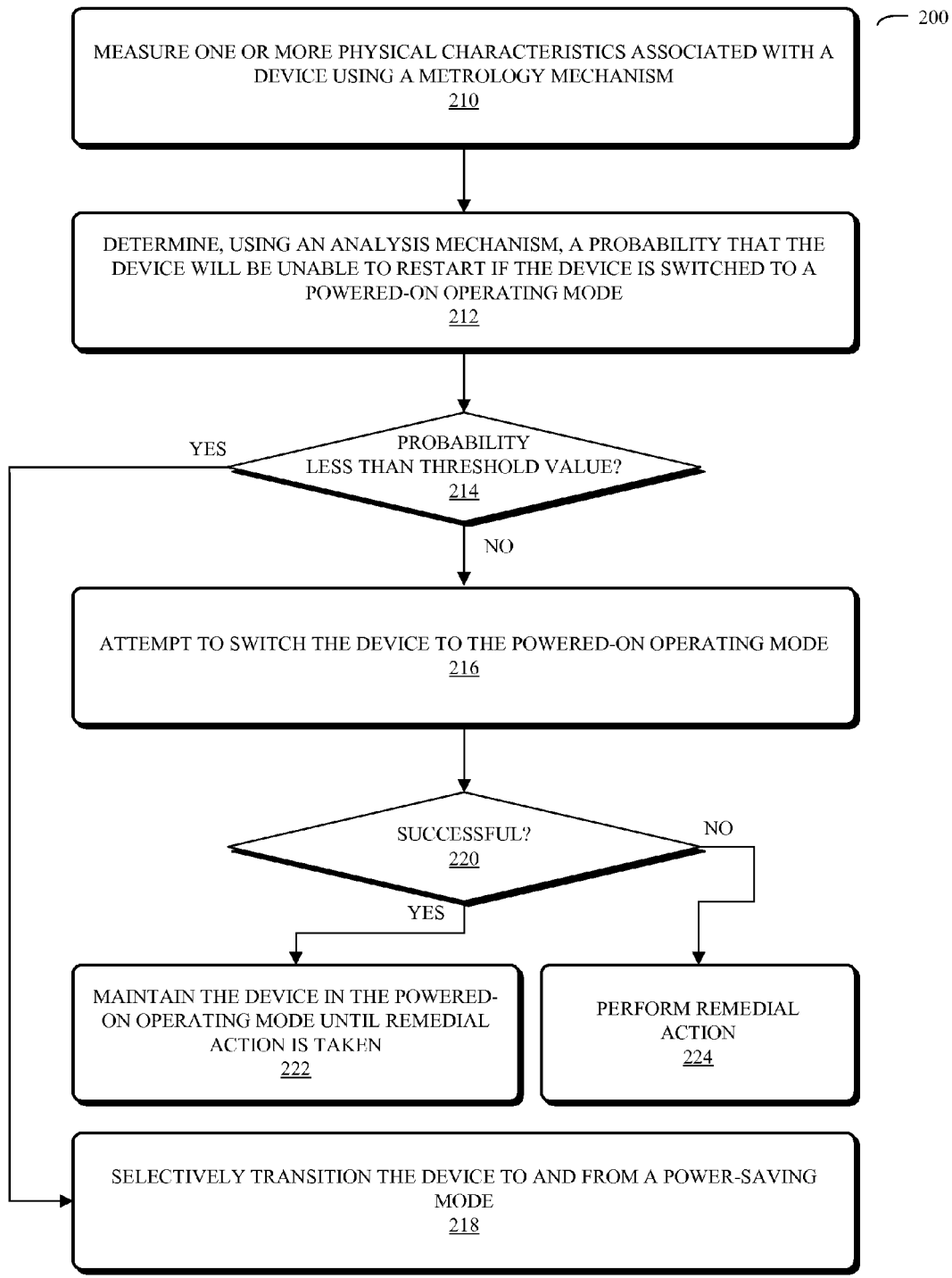
FIG. 2 is a flowchart illustrating an embodiment of a process for assessing reliability of a device.

We now describe embodiments of a reliability assessment technique. FIG. 2 presents a flowchart illustrating a process 200 for assessing reliability of a device, which may be performed in a system, such as system 100 (FIG. 1), using hardware and/or software. During operation, the system measures one or more physical characteristics associated with a device (such as device 112-1 in FIG. 1) using a metrology mechanism (210) (such as metrology mechanism 114 in FIG. 1). Then, using an analysis mechanism (such as analysis mechanism 116 in FIG. 1), the system determines the probability that the device will be unable to restart if the device is switched to a powered-on operating mode (212). This probability is determined based at least in part on one or more values of the one or more physical characteristics and predetermined probabilities of occurrence of one or more failure mechanisms.

In some embodiments, the system attempts to switch the device to the powered-on operating mode (216) if the probability exceeds the threshold value (214). If successful (220), the system may maintain the device in the powered-on operating mode until remedial action is taken (222). For example, the device may be replaced or repaired. However, if unsuccessful (220), the system may perform remedial action (224).

Alternatively, if the probability is less than the threshold value (214), the system selectively transitions the device, as needed, to and from a power-saving mode (218). Note that the threshold value may be selected based at least in part on a tolerance of the model (such as a supervised-learning model) that is used to determine the probability.

In some embodiments, process 200 includes additional or fewer operations. Moreover, the order of the operations may be changed and/or two or more operations may be combined into a single operation.

In an exemplary embodiment, devices 112 (FIG. 1) are hard disk drives. Based on known failure mechanisms for this type of hard disk drive, metrology mechanism 114 (FIG. 1) performs measurements on chipsets and electro-motors. For example, the main failure mode may be a wiring failure in the electro-motors. Consequently, measurements of the resistance of the electro-motor wiring can be used to predict the probability of failure. More specifically, using the one or more measured physical characteristics and predetermined failure probabilities, analysis mechanism 116 (FIG. 1) determines the probability that a given hard disk drive will turn back on (and spin up).

Figure 3:
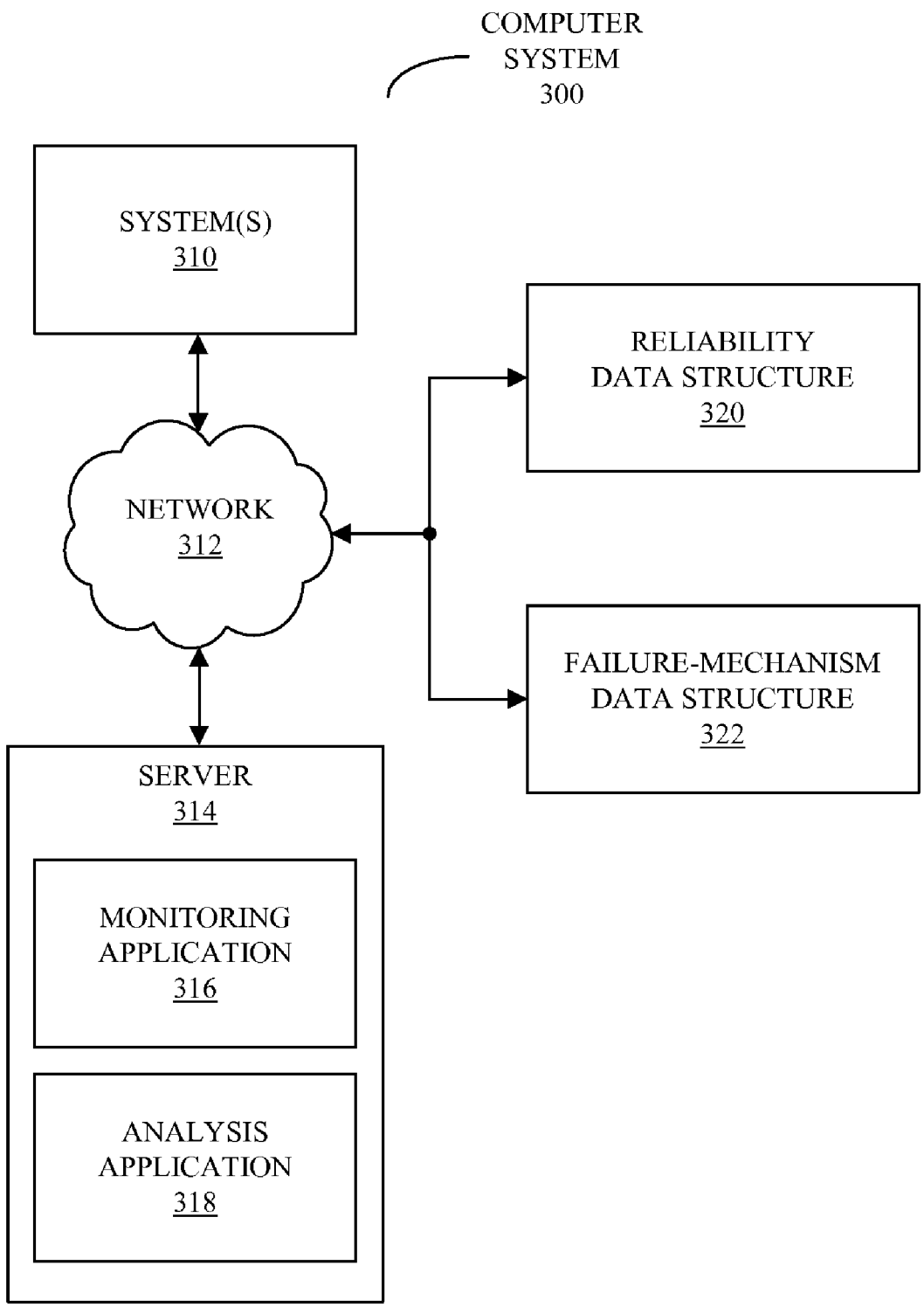
FIG. 3 is a block diagram illustrating an embodiment of a networked computer system that assesses reliability of the device.

We now describe embodiments of a computer system that may be used to assess the reliability of a device. FIG. 3 presents a block diagram illustrating a networked computer system 300 that assesses reliability of the device. In this computer system, server 314 may be used, at least in part, to monitor one or more systems 310 via network 312, and to determine the probability that one or more devices in systems 310 will be unable to restart. In particular, a monitoring application 316 may collect measurement values from the devices in systems 310 (for example, using distributed metrology circuits in these systems) and the results may be stored in reliability data structure 320. Note that reliability data structures 320 may also include an operating history of the one or more of systems 310, such as how many times and/or how frequently devices are turned on or off. Then, analysis application 318 may determine the probability for a given device using the information in reliability data structure 320, as well as the information in failure-mechanism data structure 322 (which includes predetermined probabilities of occurrence of one or more failure mechanisms in the devices).

In some embodiments, network 312 includes: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices. Consequently, the reliability assessment technique may, at least in part, be implemented remotely for systems 310 that are at one location or which are geographically distributed.

Figure 4:
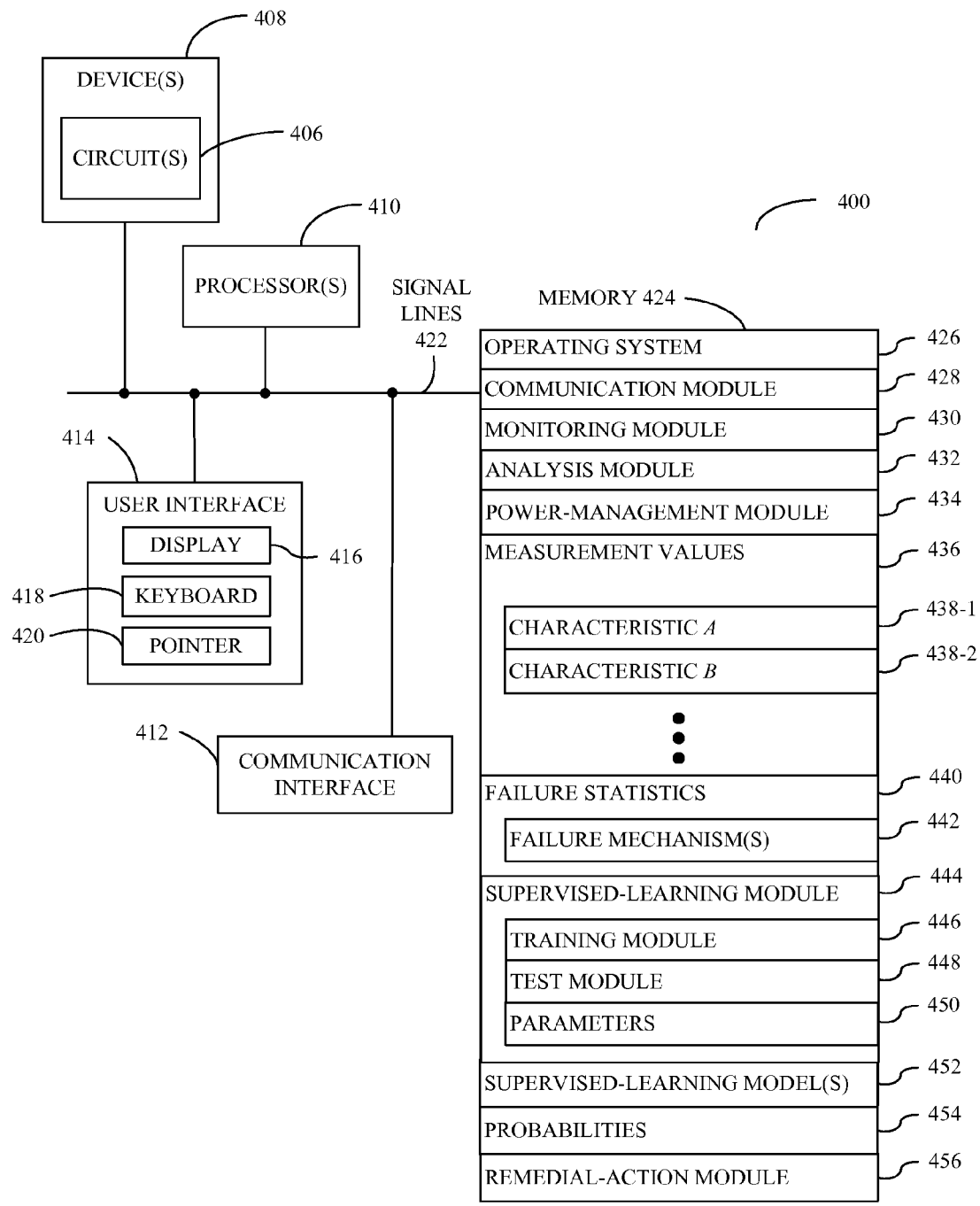
FIG. 4 is a block diagram illustrating an embodiment of a computer system that assesses reliability of the device.

We now describe the computer system in more detail. FIG. 4 presents a block diagram illustrating a computer system 400 that assesses reliability of the device. Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. While not shown in FIG. 4, the operating system 426 may include a web browser (or set of instructions) for providing and/or rendering information in web pages. Memory 424 may also store communications procedures (or a set of instructions) in a communication module 428. These communication procedures may be used for communicating with: one or more computers, devices and/or servers, including computers, devices and/or servers that are remotely located with respect to the computer system 400.

Memory 424 may also include one or more program modules (or sets of instructions), including: monitoring module 430 (or a set of instructions), analysis module 432 (or a set of instructions), power-management module 434 (or a set of instructions), supervised-learning module 444 (or a set of instructions) and/or remedial-action module 456 (or a set of instructions). Moreover, supervised-learning module 444 (or a set of instructions) may include: training module 446 (or a set of instructions) and/or test module 448 (or a set of instructions).

During operation of computer system 400, monitoring module 430 may measure one or more physical characteristics of devices 408 in computer system 400 when these devices are in a power-saving mode. These measurements may be stored in measurement values 436, such as measurements of characteristic A 438-1 and characteristic B 438-2 for one or more of devices 408. Using these measurement values and failure probabilities or statistics 440 for one or more failure mechanisms 442, analysis module 432 may determine probabilities 454 that one or more of devices 408 will be unable to restart. Then, power-management module 434 may leave at least some of the devices 408 turned on (i.e., may transition at least some of devices 408 to the power-saving mode, and maintain them in this state), or may leave at least some of devices 408 turned off based at least in part on probabilities 454. Additionally, if some of probabilities 454 are greater than a threshold value, remedial-action module 456 may perform remedial action, such as repairing a given device (for example, by modifying software settings), or flag the given device for replacement.

In some embodiments, analysis module 432 determines probabilities 454 using one or more supervised-learning models 452. These supervised-learning models may be generated using supervised-learning module 444. For example, training module 446 may generate a given supervised-learning model using training data and model parameters 450. Then, test module 448 may confirm the accuracy of the given supervised-learning model using test data. Note that the training data and the test data may be separate subsets of measurement values 436 and failure statistics 440.

In some embodiments, monitoring module 430 and/or analysis module 432 are implemented, at least in part, using dedicated hardware (such as circuits 406) in devices 408. These circuits may provided the determined probabilities to power-management module 434 and/or remedial-action module 456.

Instructions in the various modules in memory 424 may be implemented in: a high-level procedural language, an object-oriented programming language, and/or in an assembly or machine language. The programming language may be compiled or interpreted, i.e., configurable or configured, to be executed by the one or more processing units 410.

Although the computer system 400 is illustrated as having a number of discrete components, FIG. 4 is intended to be a functional description of the various features that may be present in computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions.

In some embodiments, some or all of the functionality of the computer system 400 may be implemented in one or more application-specific integrated circuits (ASICs) and/or one or more digital signal processors (DSPs). In some embodiments, the functionality of system 100 (FIG. 1), and computer systems 300 (FIG. 3) and 400 may be implemented more in hardware and less in software, or less in hardware and more in software, as is known in the art.

We now describe embodiments of a data structure that may be used in computer systems 300 (FIG. 3) and 400. FIG. 5 presents a block diagram illustrating a data structure 500. This data structure may include failure statistics 510 for one or more devices. For example, failure statistics 510-1 may include: information specifying one or more devices 512-1, and multiple pairs of failure mechanisms 514 and associated failure probabilities 516.

FIG. 6 presents a block diagram illustrating a data structure 600. This data structure may include measurements and/or determined probabilities for devices 610. For example, the measurements and/or determined probabilities for device 610-1 may include multiple instances of: times 612, measured physical characteristics 614 and determined probabilities 616.

Note that system 100 (FIG. 1), computer system 300 (FIG. 3), computer system 400 (FIG. 4), data structure 500 (FIG. 5) and/or data structure 600 may include additional or fewer components. Moreover, two or more components may be combined into a single component and/or a position of one or more components may be changed.

While the preceding embodiments illustrate the reliability assessment technique being performed while a given device is in the power-saving mode, in other embodiments the reliability assessment technique may be performed when the given device is in the powered-on operating mode. In these embodiments, the given device may be maintained in the powered-on operating mode (i.e., the given device may not be switched to the power-saving mode) until remedial action is performed if the determined probability exceeds the threshold value.

The foregoing descriptions of embodiments have been presented for purposes of illustration and description only. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A system, comprising:
a device;
a metrology mechanism to measure one or more physical characteristics associated with the device;
an analysis mechanism to determine a probability that the device will be unable to restart after the device is switched to a powered-on operating mode, wherein the probability is determined based at least in part on one or more values of the one or more physical characteristics and predetermined probabilities of occurrence of one or more failure mechanisms; and
a control logic to:
determine that the probability exceeds a threshold value;
switch the device to the powered-on operating mode; and
maintain the device in the powered-on operating mode until remedial action is taken.

2. The system of claim 1, wherein the metrology mechanism measures an electrical characteristic of the device.

3. The system of claim 1, wherein the metrology mechanism measures vibrations associated with operation of the device.

4. The system of claim 1, wherein the metrology mechanism measures wear of one or more components in the device.

5. The system of claim 1, wherein the metrology mechanism measures a torque corresponding to friction between components in the device.

6. The system of claim 5, wherein the friction includes static or dynamic friction.

7. The system of claim 5, wherein the torque is measured by applying one or more transient electrical signals to the device.

8. The system of claim 1, wherein the analysis mechanism includes a computer, which includes:
a processor;
memory; and
a program module, wherein the program module is stored in the memory and configured to be executed by the processor, the program module including instructions for determining the probability.

9. The system of claim 1, wherein the analysis mechanism includes a circuit that determines the probability.

10. The system of claim 1, wherein the device includes an electro-motor.

11. The system of claim 1, wherein the device includes two or more components that are configured to move relative to each other when the device is in a powered-on operating mode.

12. The system of claim 1, wherein the device includes a power supply.

13. The system of claim 1, wherein the device includes a computer.

14. The system of claim 1, wherein the device includes an electrical socket.

15. The system of claim 1, wherein the probability is determined using a supervised-learning model that has the one or more values of the one or more physical characteristics as inputs and the probability as an output.

16. A computer system, comprising:
a processor;
a device;
a metrology mechanism to measure one or more physical characteristics associated with the device;
an analysis mechanism to determine a probability that the device will be unable to restart after the device is switched to a powered-on operating mode, wherein the probability is determined based at least in part on one or more values of the one or more physical characteristics and predetermined probabilities of occurrence of one or more failure mechanisms; and a control logic to:
determine that the probability exceeds a threshold value;
switch the device to the powered-on operating mode; and
maintain the device in the powered-on operating mode until remedial action is taken.

17. A method for assessing reliability of a device, comprising:
- measuring, at a computer system, one or more physical characteristics associated with the device using a metrology mechanism;
- determining, using an analysis mechanism of the computer system, a probability that the device will be unable to restart after the device is switched to a powered-on operating mode, wherein the probability is determined based at least in part on one or more values of the one or more physical characteristics and predetermined probabilities of occurrence of one or more failure mechanisms;
- determining that the probability exceeds a threshold value;
- switching the device to the powered-on operating mode; and
- maintaining the device in the powered-on operating mode until remedial action is taken.

18. The method of claim 17, wherein the metrology mechanism measures an electrical characteristic of the device.

19. The method of claim 17, wherein the device includes two or more components that are configured to move relative to each other when the device is in a powered-on operating mode.

20. The method of claim 17, wherein the probability is determined using a supervised-learning model that has the one or more values of the one or more physical characteristics as inputs and the probability as an output.

21. The method of claim 17, wherein probability is determined using a program module that executes on a computer.

22. The method of claim 17, wherein probability is determined using a circuit.

* * * * *